Figure 1:
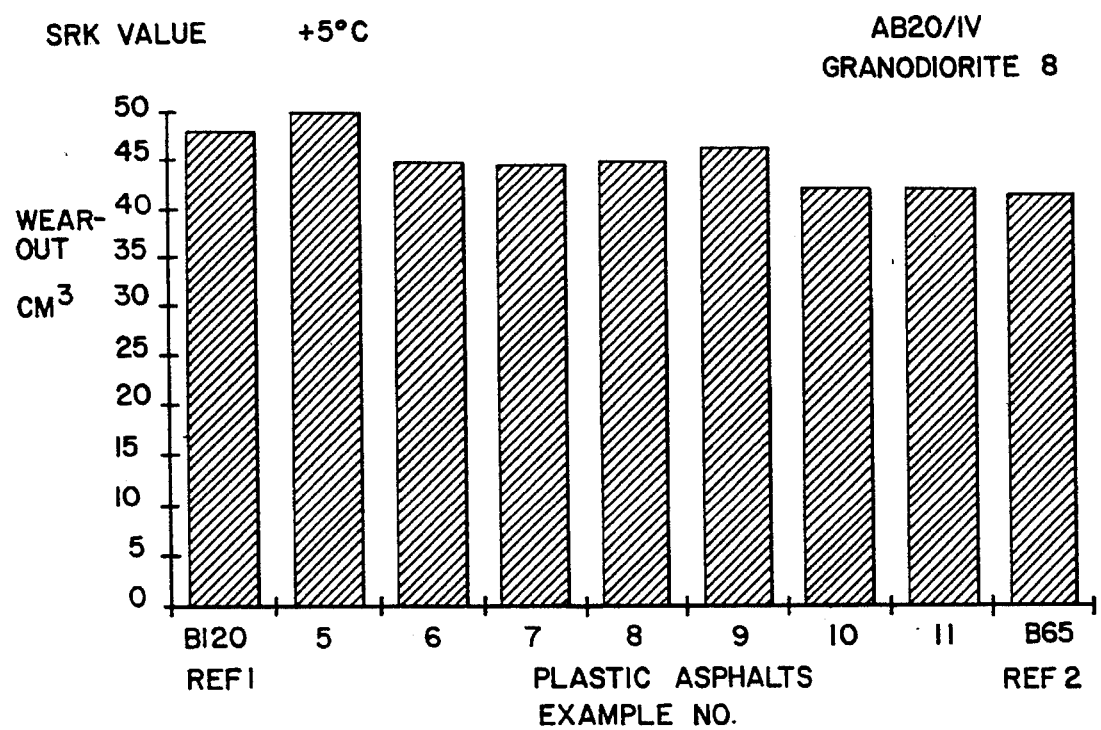

United States Patent [19]

Pinomaa

[11] Patent Number: 5,473,000
[45] Date of Patent: Dec. 5, 1995

[54] METHOD FOR IMPROVING THE STRENGTH OF BITUMEN, ASPHALT OR A SIMILAR MATERIAL, AND A COMPOSITION OBTAINED BY THE METHOD

[75] Inventor: Olli L. Pinomaa, Helsinki, Finland

[73] Assignee: O. Pinomaa Ky, Helsinki, Finland

[21] Appl. No.: 978,246

[22] Filed: Nov. 18, 1992

[30] Foreign Application Priority Data

Nov. 18, 1991 [FI] Finland .................................... 915438
May 27, 1992 [FI] Finland .................................... 922455

[51] Int. Cl.⁶ .................................................. C08L 95/00
[52] U.S. Cl. ........................... 524/59; 524/66; 524/68; 524/69; 524/70; 524/71
[58] Field of Search ................................ 524/59, 66, 68, 524/69, 70, 71

[56] References Cited

U.S. PATENT DOCUMENTS

| | | | |
|---|---|---|---|
| 3,896,069 | 7/1975 | Kosaka et al. | 524/68 |
| 4,008,095 | 2/1977 | Fukushima et al. | 524/64 |
| 4,064,082 | 12/1977 | Henschel | 524/62 |
| 4,422,878 | 12/1983 | Fry | 524/59 |
| 4,425,453 | 1/1984 | Hunter | 524/59 |
| 4,433,084 | 2/1984 | Ostermeyer et al. | 524/59 |
| 4,437,896 | 3/1984 | Partanen | 524/59 |
| 4,738,996 | 4/1988 | Vonk et al. | 524/59 |
| 5,023,282 | 6/1991 | Neubert | 524/59 |
| 5,221,703 | 6/1993 | Ostermeyer | 524/68 |

FOREIGN PATENT DOCUMENTS

| | | | |
|---|---|---|---|
| 0852917 | 8/1981 | Belarus | 524/59 |
| 2183618 | 12/1973 | France | 524/68 |
| 2331727 | 1/1975 | Germany | C08L 95/00 |
| 0161853 | 12/1980 | Japan | 524/69 |
| 1127255 | 9/1968 | United Kingdom. | |
| 1379392 | 1/1975 | United Kingdom. | |
| 1431431 | 4/1976 | United Kingdom | C08L 95/00 |
| 2221686 | 2/1990 | United Kingdom | 524/68 |

OTHER PUBLICATIONS

Journal of Applied Polymer Science, vol. 31, 2685–2704 (1986), Jew et al. "Polyethylene–Modified Bitumen for Paving Applications".

*Primary Examiner*—Peter A. Szekely
*Attorney, Agent, or Firm*—Dressler, Goldsmith, Shore & Milnamow, Ltd.

[57] ABSTRACT

The invention relates to a method for improving the properties of bitumen, asphalt, or a similar material by adding to it a thermoplastic or a thermoelastomer, the solubility and compatibility of the thermoplastic or thermoelastomer being improved by a third component, which is wood resin, turpentine resin, a derivative of these, tall oil, tall-oil pitch, or a constituent or mixture of these. The obtained composition of bitumen, asphalt or a similar material can be used as a binding agent in road pavement materials.

16 Claims, 2 Drawing Sheets

METHOD FOR IMPROVING THE STRENGTH OF BITUMEN, ASPHALT OR A SIMILAR MATERIAL, AND A COMPOSITION OBTAINED BY THE METHOD

The invention relates to a method for improving the properties of bitumen, asphalt, or a similar material by heating and intermixing the following components:
a) a thermoplastic or a thermoelastomer and
b) bitumen, asphalt, or a similar material.

The invention also relates to a composition based on bitumen, asphalt or a corresponding material and comprising:
a) a thermoplastic or a thermoelastomer and
b) bitumen, asphalt, or a similar material.

Since waste plastics are produced in large amounts, efforts have been made to find uses for them. To solve the waste problem, efforts have previously been made to mix plastics into bitumen, the purpose also being to strengthen the bitumen. The plastics have been chopped finely and been mixed as such into bitumen. However, no technical advantage has been achieved thereby. Also known is a method in which comminuted plastic is emulsified in an aqueous solution to form a suspension, whereupon it has been possible to mix it into emulsified bitumens. This method is suitable only for emulsified bitumens. Efforts have also been made previously to dissolve plastics in different solvents, and the solutions thus obtained have further been mixed into bitumen. In bitumen, however, the solvents have deteriorated its original strength properties or have been toxic.

It is an object of the present invention to provide a method by which the strength properties of bitumen, asphalt or a similar material can be retained or improved by mixing plastic into it. It is a particular aim to avoid producing the said detrimental properties. The invention also aims at a composition, based on bitumen, asphalt or a similar material, which has useful properties. These objects of the invention have now been achieved using a new method and composition which are mainly characterized in what is stated in the characterizing clauses of the independent patent claims 1 and 9. It has thus been realized that by using, in addition to a thermoplastic or thermoelastomer component and a bitumen, asphalt or similar material component, also a third component, which is tall resin, wood resin, turpentine resin, a derivative of these, tall oil, tall-oil pitch, or a constituent or mixture of these, there is obtained a composition based on bitumen, asphalt or a corresponding material, in which composition the plastic is distributed homogeneously so that it will even improve the mechanical properties of the composition.

According to its broadest definition, the bitumen used in the method and composition according to the invention is a natural or technologically produced complex organic mixture of varying color and consistency, mainly composed of hydrocarbonaceous and/or organic oxygen compounds. By 'bitumen' is specifically meant asphalts and petroleum distillation residues (Asphaltic Bitumen). Bitumens are mixtures of different types of materials, such as asphaltenes, resins, solid paraffins, kerosines, hydrocarbonaceous oils, ester waxes, kerogens, high-molecular acids, and metalorganic compounds. Natural bitumens are obtained, for example, from natural gas, crude petroleum, natural asphalts, mineral wax (ozokerite), montan wax (brown carbon bitumen), and fossil resins. Man-made bitumens are obtained from petroleum distillates, solid paraffin, petroleum distillation residues, residues from the acid treatment of petroleum products, and products of solvent and precipitant treatments of petroleum products. In the United States there are further defined so-called pyrobitumens, which are classified into asphaltic pyrobitumens (wurtzilite, elaterite, albertire and impsonite) and kerogenites (shales and limestones).

By 'asphalt' is meant primarily conventional asphalt and emulsified asphalt, which is a bitumen product emulsified in water.

Materials similar to bitumen and asphalt include road oil, which is an asphalt-containing, slowly hardening crude petroleum or a mixture containing it. The same group of materials also includes dust-binding road oil, which is a petroleum-based distillation fraction lighter than asphalt. Another material closely related chemically is road tar, which is a heavier product obtained from coal by carbonating. It consists of medium-soft pitch softened further by means of high-boiling tar oils. The viscosity of road tar is especially sensitive to changes of temperature, and the adding of polymers to road tar reduces its temperature sensitivity.

Compositions according to the invention, based on bitumen, asphalt or a similar material, can be used, for example, as binders with mineral aggregates, fillers or fiber materials, in which case working in general takes place by using melting. Compositions according to the invention can also be used for the impregnation of cardboard, papers or foils and for the coating of concrete, mortar or metal, in which case the working can take place at room temperature by using dissolving or dispersing. If bitumen is used, it may be of any commercial quality, such as standard (ASTMD 5–73) type B-45, B-65, B-80, B-200, B-300, B-400 or B-800. An "average" standard bitumen, B-120, was used in the experiments.

The second component of the method and composition according to the invention is a thermoplastic or a thermoelastomer. By 'thermoplastic' and 'thermoelastomer' are meant plastics and elastomers the unbridged polymer structure of which allows them to be dissolved and melted. By the present invention, highly different thermoplastics and thermoplastic mixtures have been dissolved, one example being a mixture of polyethylene and polyamide. Polyethylene is a lipophilic hydrocarbon, whereas amide plastic is a polar condensation product which forms strong hydrogen bonds. It can thus be assumed that practically all commercial thermoplastics and thermoelastomers are suitable for use as the thermoplastic or thermoelastomer component in the present invention.

Plastics and elastomers suitable in terms of the invention include acetal plastic, acrylic plastic, acrylonitrile-butadiene-styrene plastic, amide plastic, allyl-phthalate plastic, linear ester plastic and elastomer, olefin plastic, chloroethylene plastic, ethylene-ethyl acrylate plastic, ethylene-propylene rubber, ethylene terephthalate plastic, ethylene-vinyl acetate rubber, ethylene-vinyl acetate plastic, ether sulfonic plastic, isobutylene plastic, carbonate plastic, methyl methacrylate plastic, oxymethylene plastic, stryrene plastic, styrene-acrylonitrile plastic, styrene-butadiene thermoelastomer, styrene-isoprene thermoelastomer, styrene-olefin thermoelastomer, urethane plastic, urethane thermoelastomer, vinyl acetate plastic, vinyl acetal plastic, vinyl alcohol plastic, vinyl butyral plastic, vinyl ether plastic, vinylidene chloride plastic, vinyl chloride plastic, chlorinated vinyl chloride plastic, vinyl chloride acetate plastic, cellulose ester plastic, and cellulose ether plastic.

In addition to the above-mentioned mixture of polyester, which is an olefin plastic, and amide plastic, which is a condensation plastic, it is possible to use, for example, a low-density polyethylene having a melt index of 4-5, or for example a mixture the break-down of which is as follows:

| low-density polyethylene | 60% |
|---|---|
| polypropylene | 20% |
| polystyrene | 15% |
| polyvinyl chloride | 5% | polyvinyl chloride 5%

It is particularly important to note that the present invention works very well with mixtures made up of various thermoplastics, of various thermoelastomers and thermoplastics, and of various thermoelastomers.

According to one embodiment, the thermoplastic is polyethylene, polypropylene, poll;vinyl alcohol, polyamide, polyvinyl chloride, polyester, polystyrene, acrylic polymer, polybutadiene, polyether, polycarbonate, or a derivative or mixture of these.

Tall resin consists mainly of abietic acid and related acids, i.e. resin acids, approx. 90%. Tetrahydroabietic acid, dihydroabietic acid, palustric acid, levopimaric acid, abietic acid, and dehydroabietic acid are some examples of resin acids to be mentioned. It may be due to these and also other components of tall resin that tall resin has a dissolving action on thermoplastics and thermoelastomers and a stabilizing action on the solution when these are blended with bitumen, asphalt or a similar material. Wood resin and turpentine resin are related to tall resin, since they have been extracted from the same raw material, i.e. wood. Tall oil belongs to the same group as tall resin, because it is the raw material of the latter. Tall-oil pitch, on the other hand, is a distillation residue of crude tall oil.

It has thus been observed that tall resin and the said compounds related to it have an excellent capacity to dissolve a number of polymers. When softened with plastic and elastomeric oil products, resins, oils and pitch become highly adhesive; whereupon the use of tall resin and materials related to it in bitumen increases its adhesion. The use of tall resin and related materials as the solvent thus as such improves the properties of bitumen.

Thus not only tall resin but also wood resin, turpentine resin, a derivative of these, tall oil, tall-oil pitch, or a constituent or mixture of these can be used as the solvent. All of these said substances are hereinafter called by the general name 'pine processing products' , although they may be derived from wood also other than pine. A tall oil distillate contains resin acids approx. 25-30% by weight and fatty acids approx. 70% by weight. Tall-oil pitch is the unvaporized fraction in the distillation of raw tall oil. It contains resin acids approx. 10% by weight, heavy fatty acids 3-4% by weight, and neutral esters approx. 5% by weight. Its molecular weight is approx. 350-600 g/mol.

According to the broadest embodiment of the method according to the invention, the said three components can be blended in any order whatsoever. In this case it is advantageous to blend them at a temperature within a range of approx. 130°-300° C. A more preferable temperature range is approx. 150°-260° C., and the most preferable range approx. 200°-230° C.

As was already mentioned, the different components can be blended in any order whatsoever, i.e. the thermoplastic or thermoelastomer can, for example, be first dissolved in a pine processing product, whereafter the solution or mixture of these two components is added to the bitumen, asphalt or similar material. According to another embodiment, the bitumen, asphalt or similar material can be blended with the pine processing product, and the thermoplastic or thermoelastomer can be added to a mixture of these two components. Thirdly, the bitumen, asphalt or similar material can be blended with the thermoplastic or thermoelastomer, and finally the said pine processing product can be added to the mixture of these two components.

According to a preferred embodiment of the method according to the invention, the thermoplastic or thermoelastomer is first dissolved in a hot, molten pine processing product, and the obtained solution is then mixed into the bitumen, asphalt or similar material. In this case it is advantageous to carry out the dissolving at a temperature of 150°-270° C. and preferably 230° C. The subsequent mixing into the bitumen, asphalt or similar material takes place according to one embodiment at a temperature of 150°-260° C. and preferably at a temperature of approx. 200° C.

In the method according to the invention it is advantageous if the component materials are added so that the ratio of the thermoplastic and/or thermoelastomer to the pine processing product will be between 1:0.5 and 1:4, preferably 1:2. It is also advantageous if the proportion of the thermoplastic and/or thermoelastomer in the final composition of bitumen, asphalt or similar material is approx. 2-60%, preferably approx. 4-50%, and most preferably 5-20% of the weight of the final composition.

As was already stated, the invention also relates to a composition based on bitumen, asphalt or a similar material, the composition comprising:

a) a thermoplastic or a thermoelastomer,
b) bitumen, asphalt, or a similar material, and the composition being characterized in that it also comprises:
c) tall resin, wood resin, turpentine resin, a derivative of these, tall oil, tall-oil pitch, or a constituent or mixture of these.

In the composition according to the invention, the thermoplastic or thermoelastomer is, of course, used at the same ratio to the pine processing product as is presented above in connection with the method, and in the same proportion of the weight of the composition. The bitumen, asphalt or similar material on which the composition according to the invention is based, is also by definition the same as presented above in connection with the description of the method. The same applies to the so-called pine processing product.

The method and composition according to the invention thus constitute an excellent solution to the problem of waste plastics. Since what is concerned is compositions of bitumen, asphalt or a similar material, small amounts of impurities can be allowed in them.

According to one embodiment of the invention, the intermixing of the plastic and the pine processing product is carried out by first heating the pine processing product to a temperature of approx. 150°-270° C., the preferred temperature being approx. 230° C. The plastic or thermoelastomer is added gradually while stirring continuously with a propeller stirrer equipped with a blade and having a rotation speed of approx. 50-120 rpm. The mixing ratio plastic: processing product is between 1:05 and 1:4, but preferably 1:2. The solution of plastic and pine processing product thus obtained is mixed into bitumen. The bitumen may be of the conventional "average" standard type B-120, but, for example, any of the standard types B-45, B-65, B-80, B-200, B-300, B-400 or B-800 can be selected. It is also possible to use so-called road oil instead of bitumen. The mixing takes place by heating the bitumen to a temperature of approx. 150°-260° C., preferably approx. 200° C., and by adding to it a solution of plastic and pine processing product, having a temperature of approx. 200°–230° C. The solution of plastic and pine processing product is poured into the bitumen slowly while stirring the bitumen mixture continuously with a propeller stirrer. After the addition, the mixture is stirred for approx. 2 minutes further. In mixing a solution of plastic and tall-oil pitch into bitumen, a high-efficiency stirrer should be used for the purpose of dispersing.

The solution of plastic and pine processing product is usually added at a rate which produces in the bitumen, asphalt or similar material a final plastics content of preferably approx. 4–20% of the total weight of the composition.

The invention is elucidated below with the help of examples.

EXAMPLE 1

| Starting materials: | |
| --- | --- |
| Tall resin 331 H (Veitsiluoto Oy) | 720 g |
| Polyethylene NCPE 4927 (Neste Oy) | 240 g |
| Bitumen B-120 | 3840 g |

The tall resin was melted in a 3-liter decanter on a hot plate. After the melting, the temperature was raised to 200° C., and then polyethylene having a melt index of 4 was gradually added to the resin. A propeller stirrer equipped with a blade and having a rotation speed of 60–100 rpm was used for the stirring. The blending temperature was 190°–220° C. The mixture of plastic and resin was heated to 200° C., and the mixture was poured into 200° C. bitumen while stirring with a propeller stirrer at 100 rpm. The stirring was continued throughout the pouring and further for approx. 2 min after the pouring had ended. The proportion of plastics in the final bitumen composition was 5%.

EXAMPLE 2

| Starting materials: | |
| --- | --- |
| Tall resin Beviros 90 (Bergvik Kemi AB) | 720 g |
| Waste plastics mixture Pael PE 50%–PP 50% (Valke Oy) | 180 g |
| Bitumen B-120 | 2920 g |

The procedure was as in Example 1. A waste plastics mixture was used instead of polyethylene, and the resin::plastics ratio in the mixture was raised to 2:1. According to the above, the proportion of plastics in the final resin/plastic/bitumen composition is 5.2%.

EXAMPLE 3

| Starting materials: | |
| --- | --- |
| Tall-oil pitch Oulu 90 (Veitsiluoto Oy) | 360 g |
| Waste plastics mixture Pael PE 50%–PP 50% (Valke Oy) | 180 g |
| Bitumen B-120 | 2824 g |

The procedure was as in Example 1. In order to get the solution of pitch and plastics more effectively mixed into the bitumen, a turbo-mixer was used in order that the pitch/plastic should remain unseparated in the final composition. The proportion of plastics in the whole composition was 5.35%.

Each of the compositions prepared in Examples 1–3 (bitumen/resin or tall-oil pitch/plastics) was used as a binding agent by mixing it at 200° C. into an aggregate heated to the same temperature and having a grading curve of AB20. The mix obtained was used for preparing test slabs. A wear test was performed on the slabs, and their Marshall values were measured.

The results are shown in the following table, for which the values were measured for bitumen B-120 alone and for the same bitumen to which a plastic/resin or tall-oil pitch component had been added.

TABLE 1

| | B-120 | Ex. 1 plastics 5% | Ex. 2 plastics 5.2% | Ex. 3 plastics 5.35% |
| --- | --- | --- | --- | --- |
| Binding agent: | | | | |
| Softening point R & B, ASTM D2398-76° C. | 44 | 51 | 48 | 50 |
| Penetration ASTM D 5-73 | 120 | 70 | 72 | 74 |
| Mix (6% binding agent) Wear test: | | | | |
| SRK Road 406, cm³ | 51.9 | 47.3 | 47.9 | 51.0 |
| Marshall value, KN | 4–5 | 6.3 | 6.4 | 4.8 |

EXAMPLE 4–10

In these examples, the procedure was as follows.

The amounts (g) of materials used are obtained by multiplying the percentages in Table 2 (see column "Binding agent composition") by 30. The indicated amount of tall-oil pitch and/or tall resin is added into a 5-liter vessel on a hot plate. To this is then added, while slowly stirring, the indicated amount of plastic, which is a laminate waste plastic containing polyethylene 70% by weight and polyamide 30% by weight. The stirring can start only when the pitch has reached a temperature of 200° C., at which time 150 rpm is set as the speed of the propeller stirrer. When the plastic has dissolved evenly into the tall-oil pitch and/or tall resin, the solution of plastic and tall-oil pitch (resin) is poured into a 180° C. bitumen the quality of which is B-120 and amount 2100 g, the mixture being stirred constantly with the propeller stirrer for approx. 5 min. In Example 8 the Work was started by pouring the resin and pitch into the vessel simultaneously. The results are shown in Table 2.

EXAMPLE 11

2250 g of bitumen B-120 at a temperature of 200° C. was weighed into a mixing vessel (5 liters). 600 g of a laminate waste plastic was added to it by stirring using a propeller stirrer, rotation speed 150 rpm. Composition of the laminate waste plastic: polyethylene 70%, polyamide 30%. After the temperature had been raised to 210 ° C. after the adding of the waste plastic, 150 g of tall resin was added to it. Now the plastic dissolved completely during the mixing after the temperature had again risen to 210 ° C. The dissolving after the addition of the resin took approx. 20 min. The results are shown in Table 2.

EXAMPLE 12

210 g of waste plastics LDPE+PP+PS+PVC, 540 g of tall-oil pitch, and 2400 g of bitumen B-120 were weighed. The purpose was to observe whether this waste plastics mixture would dissolve, and to measure its homogeneity. The tall-oil pitch was heated to 220° C., and then waste plastic was gradually added to it. When 180 g of waste plastic had been added, 400 g of 180° C. bitumen was added and, after the temperature had again risen to 220° C., the remaining 30 g of the plastic was added. The mixture thus obtained was poured into a 180° C. bitumen. To observe the homogeneity, ring-and-ball softening points were measured from a large specimen; softening points were found within the range 93°–96° C.

TABLE 2

| | Binding agent composition | | | | Binding agent | | Mixing temp. | Mix AB20/IV Creep | | |
|---|---|---|---|---|---|---|---|---|---|---|
| Ex. | B120 | pl | pi | re | Pen | r-b | | st$_p$ | pul | SRK |
| 4 | 85 | 5 | 5 | 5 | 107 | 47 | 215 | 0.77 | 41 | — |
| 5 | 70 | 12 | 18 | — | 56 | 96 | 200 | 0.61 | 17 | 49.9 |
| 6 | 80 | 7 | 13 | — | 123 | 48 | 210 | 0.71 | 19 | 44.7 |
| 7 | 60 | 20 | 20 | — | 54 | 97 | 220 | 0.59 | 23 | 44.4 |
| 8 | 80 | 7 | 10 | 3 | 156 | 44 | 210 | 0.92 | 30 | 44.7 |
| 9 | 75 | 15 | 10 | — | 55 | 92 | 210 | 0.51 | 11 | 46.1 |
| 10 | 55 | 27 | 18 | — | 29 | 101 | 220 | 0.45 | 19 | 42.0 |
| 11 | 75 | 20 | — | 5 | 29 | 98 | 200 | 0.45 | 5 | 42.0 |

Definitions of abbreviations used in Table 2
B120=bitumen having a penetration of 120
pl=laminate waste plastic, 70% polyethylene, 30% polyamide
pi=tall-oil pitch (defined in the patent application)
re=tall resin (defined in the patent application)
pen=penetration, bitumen hardness ASTM D 5-88, unit 0.1 mm
r-b=softening point, ring and ball ASTMD-36-86, unit ° C.
Fraass=fracture point, Fraass IP 80/53, unit ° C.
  The Fraass values are missing from the test diagram:
  For example 6 Fraass -21° C.
  7 Fraass -25° C.

Mix AB 20/IV stands for a composition made up of a binding agent and aggregate, i.e. asphalt in which the aggregate complies with a specific grading curve and in which the largest stone size is 20 mm. A mix (asphalt) usually contains binding agent at 5.8%.

Creep=resistance to deformation measured using a Nottingham tester (Creep test): in the Creep test the specimen is axially compressed statically (st$_p$) or pulsatingly (pul) with a pressure of 100 kPa. After one hour of loading, the total deformation of the device is measured, and after a recovery phase of one hour, the permanent deformation. Unit mm or %.

SRK (Road 406)=Examination of the wear of road pavement by using a Finnish Side-Roll wear apparatus. The wear apparatus has studded rubber wheels having a diameter of 90 mm, which wear the specimen cylinder from the side. The specimen is wetted with +5° C. water. After a test of two hours' duration, the result of the test is expressed as a wear value which is the volume of the wear groove in cm$^3$.

Table 2 shows, among other things:
The ring-and-ball softening points, i.e. softening temperatures, increase clearly as the proportion of plastics increases. The value of the reference bitumen B-120 is 44° C., and thus the plastics addition raises the r-b values close to 100° C. The Fraass fracture point, i.e. cold resistance, for the bitumen B-120 is −16° C., and so the value −25° C. obtained in the tests is quite good and means an improvement of cold resistance.

For the asphalt mix in which the binding agent is the reference bitumen B-120, the value of the SRK wear test is 48 cm$^3$, the Creep static deformation 1.2 mm and the pulsating creep 53 per mill.

The results of Table 2 are shown graphically in FIGS. 1–4.

FIG. 1 shows the SRK value, i.e. the wear, when using the binding agents of the various examples. The reference bitumens were B-120 and B-65, the former being also the basis for the compositions according to the embodiment examples. There was no great practical difference between the embodiment examples and the references, even with increasing proportions of plastic in the binding agent. To put in cautiously, there was an improvement of approx. 10%, although this so-called studded-tire test is in general not greatly dependent on the binding agent.

Figure 2:
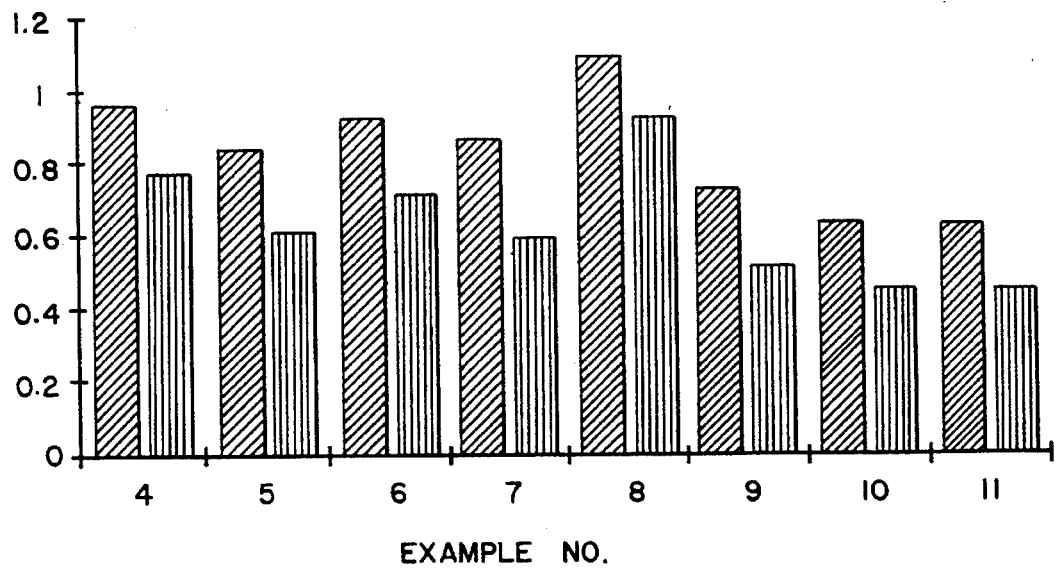

FIG. 2 depicts the static deformation (creep). The first column shows in millimeters the deformation caused by a pressure of 100 kPa, and the adjacent column the final deformation in millimeters when the specimen has been allowed to recover after the removal of the pressure. The deformation decreases as the proportion of plastics increases, and is on average approx. 30–50% less than that of the reference B-120, which is approx. 1.2 mm.

Figure 3:
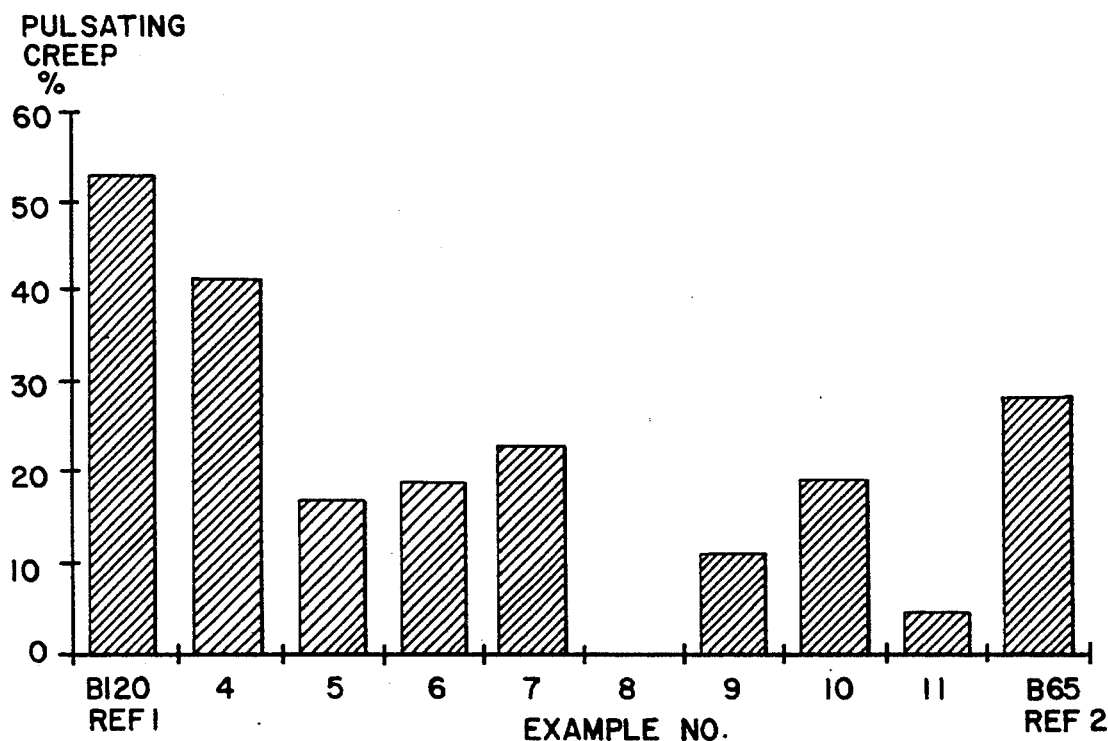

FIG. 3 shows the deformation caused by a pulsating load. In road use the detrimental deformation decreases sharply as the proportion of plastics increases, and is in the order of approx. 50–65% less than that of the reference (first column). The significance of plastics in the asphalt is shown most clearly in this test. The type of the aggregate hardly affects the result of the creep test.

Figure 4:
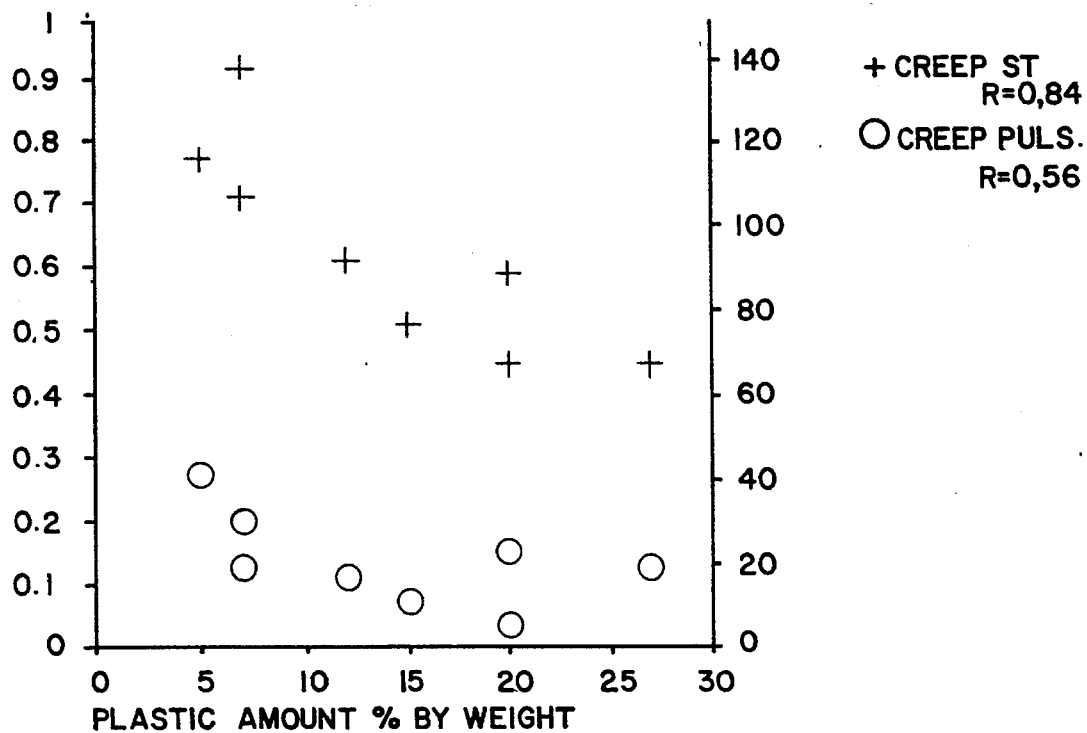

FIG. 4 shows as a graphical representation the dependence of creep on the proportion of plastics in the composition according to the invention. Both the static creep and the pulsating creep are crucially decreased as the proportion of plastics increases.

The results show that, with the adding of a mixture of plastic and resin or tall-oil pitch to bitumen, clearly better properties were obtained for the binding agent than when using only bitumen. The resistance to wear of a mix used as road pavement improved when a bitumen containing a mixture of plastic and resin or tall oil was added to it as the binding agent.

I claim:

1. A method for improving the properties of pavement bitumen, asphalt, road oil, road tar or pitch heating to approximately 150° to 270° C. and intermixing the following components: a) a thermoplastic polymer and b) bitumen, asphalt, road oil, road tar or pitch characterized in that into either one or both of the above components there is also mixed the following component, which has been selected from the group consisting of c) tall resin, wood resin, tall oil, tall-oil pitch, and a component and mixture of these materials.

2. A method according to claim 1, characterized in that the thermoplastic polymer is first dissolved in a hot, molten tall resin, wood resin, tall oil, tall-oil pitch, or a component or mixture of these materials, and the obtained solution is mixed into the bitumen, asphalt, road oil, road tar or pitch.

3. A method according to claim 1, characterized in that the thermoplastic polymer is polyethylene, polypropylene, polyvinyl alcohol, polyamide, polyvinyl chloride, polyester, polystyrene, acrylic polymer, polybutadiene, polyether, polycarbonate, or a derivative or mixture of these.

4. A method according to claim 2 characterized in that the dissolving is carried out at a temperature of approximately

230° C.

5. A method according to claim 2, characterized in that the solution is mixed into bitumen, asphalt road oil, road tar, or pitch, the temperature of which is 150°–260° C.

6. A method according to claim 1, characterized in that the ratio of the thermoplastic polymer to the tall resin, wood resin, tall oil, tall-oil pitch, or component or mixture of these is between 1:0.5 and 1:4.

7. A method according to claim 1, characterized in that the portion of thermoplastic polymer in the final composition of bitumen, asphalt, road oil, road tar or pitch is approx. 2–60%, of the weight of the final composition.

8. A pavement binder composition based on bitumen, asphalt road oil, road tar or pitch comprising:
a) a thermoplastic polymer and,
b) bitumen, asphalt, road oil, road tar or pitch, characterized in that it also comprises:
c) tall resin, wood resin, turpentine resin, tall oil, tall-oil pitch, or a component or mixture of these.

9. A composition according to claim 8, characterized in that the thermoplastic polymer is polyethylene, polypropylene, polyvinyl alcohol, polyamide, polyvinyl chloride, polyester, polystyrene, polyacrylic, polybutadiene, polyether, polycarbonate, or mixture of these.

10. A composition according to claim 8 or 9, characterized in that the ratio of the thermoplastic polymer and to the tall resin, wood resin, tall oil, tall-oil pitch, or component or mixture of these is between 1:0.5 and 1:4.

11. A composition according to claim 8 or 9, characterized in that the proportion of the thermoplastic polymer in the composition is approx. 2–60% of the weight of the composition.

12. A method according to claim 3, characterized in that the thermoplastic is polyethylene, polypropylene, polyvinyl alcohol, polyamide, polyvinyl chloride, polyester, polystyrene, acrylic polymer, polybutadiene, polyether, polycarbonate, or a derivative or mixture of these.

13. A method according to claim 3, characterized in that the dissolving is carried out at a temperature of 150°–270° C., 14. A method according to claim 3, characterized in that the solution is mixed into bitumen, asphalt road oil, road tar or pitch, the temperature of which is 150°–260° C.

15. A method according to claim 4, characterized in that the solution is mixed into bitumen, asphalt road oil, road tar or pitch, the temperature of which is 150°–260° C.

16. A composition according to claim 10, characterized in that the proportion of the thermoplastic polymer of the weight of the composition.

* * * * *